(12) United States Patent
Flemming et al.

(10) Patent No.: US 8,417,889 B2
(45) Date of Patent: Apr. 9, 2013

(54) TWO PARTITION ACCELERATOR AND APPLICATION OF TIERED FLASH TO CACHE HIERARCHY IN PARTITION ACCELERATION

(75) Inventors: Diane Garza Flemming, Pflugerville, TX (US); William A. Maron, Austin, TX (US); Ram Raghavan, Round Rock, TX (US); Mysore Sathyanarayana Srinivas, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/508,621

(22) Filed: Jul. 24, 2009

(65) Prior Publication Data

US 2011/0022803 A1 Jan. 27, 2011

(51) Int. Cl.
*G06F 13/00* (2006.01)
(52) U.S. Cl.
USPC ............ 711/122; 711/132; 711/146; 711/148
(58) Field of Classification Search .................. 711/122, 711/147, 154
See application file for complete search history.

(56) References Cited

U.S. PATENT DOCUMENTS

2005/0005073 A1* 1/2005 Pruvost et al. ................ 711/148
2010/0250856 A1* 9/2010 Owen et al. ................... 711/128

OTHER PUBLICATIONS

Dybdahl, "Architectural Techniques to Improve Cache Utilization," Dept. of Comp. Sci., Norwegian University of Sci. & Tech., 2007.
Douglis et al., "Flash Memory File Caching for Mobile Computers," Matsushita Info. Tech. Lab., IEEE, 1993.
"Large Memory Support for 32-Bit Linux," *New Functionality in Adaptive Server 12.5.2*, Chapter 11, printed Nov. 2008.
Leventhal, "Flash Storage Today," *ACM Queue*, p. 24-30. Jul./Aug. 2008.
Russinovich, "Windows Administration: Inside the Windows Vista Kernel: Part 2," TechNet Magazine, Mar. 2007.
Lorch, "Operating Systems Techniques for Reducing Processor Energy Consumption", PhD Dissertation, U. of Calif. Berkeley, 2001.
Tam et al., "Managing Shared L2 Caches on Multicore Systems in Software," Department of Electrical and Computer Engineering, Univ. of Toronto, Workshop on the Interaction between Operating Systems and Computer Architecture (WIOSCA 2007), Jun. 2007, 8 pages.

* cited by examiner

*Primary Examiner* — Reba I Elmore
(74) *Attorney, Agent, or Firm* — VanLeeuwen & VanLeeuwen; Libby Z. Toub

(57) ABSTRACT

An approach is provided to identify a disabled processing core and an active processing core from a set of processing cores included in a processing node. Each of the processing cores is assigned a cache memory. The approach extends a memory map of the cache memory assigned to the active processing core to include the cache memory assigned to the disabled processing core. A first amount of data that is used by a first process is stored by the active processing core to the cache memory assigned to the active processing core. A second amount of data is stored by the active processing core to the cache memory assigned to the inactive processing core using the extended memory map.

20 Claims, 9 Drawing Sheets

TWO PARTITION ACCELERATOR AND APPLICATION OF TIERED FLASH TO CACHE HIERARCHY IN PARTITION ACCELERATION

TECHNICAL FIELD

The present invention relates to accelerating processing of software processes such as partitions. More particularly, the present invention relates to mapping cache memory associated with disabled processing cores to active processing cores and reserving portions of the cache memory for the various partitions being executed.

BACKGROUND OF THE INVENTION

A CPU cache is a cache used by the central processing unit of a computer to reduce the average time to access memory. The cache is a smaller, faster memory which stores copies of the data from the most frequently used main memory locations. As long as most memory accesses are cached memory locations, the average latency of memory accesses will be closer to the cache latency than to the latency of main memory.

A cache memory is a cache used by a processing unit, or core, of a computer to reduce the average time to access memory. It is generally faster to store and retrieve memory from the cache than from main memory. As long as most memory accesses are cached memory locations, the average latency of memory accesses will be closer to the cache latency than to the latency of main memory. When a processor core needs to read from or write to a location in main memory, it first checks whether a copy of that data is in the cache. If so, the processor immediately reads from or writes to the cache, which is faster than reading from or writing to main memory. A multi-core node is composed of two or more independent processing cores. The cores are typically integrated onto a single integrated circuit die, or they may be integrated onto multiple dies in a single chip package, or substrate.

SUMMARY

An approach is provided to identify a disabled processing core and an active processing core from a set of processing cores included in a processing node. Each of the processing cores is assigned a cache memory. The approach extends a memory map of the cache memory assigned to the active processing core to include the cache memory assigned to the disabled processing core. A first amount of data that is used by a first process is stored by the active processing core to the cache memory assigned to the active processing core. A second amount of data is stored by the active processing core to the cache memory assigned to the inactive processing core using the extended memory map.

The foregoing is a summary and thus contains, by necessity simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
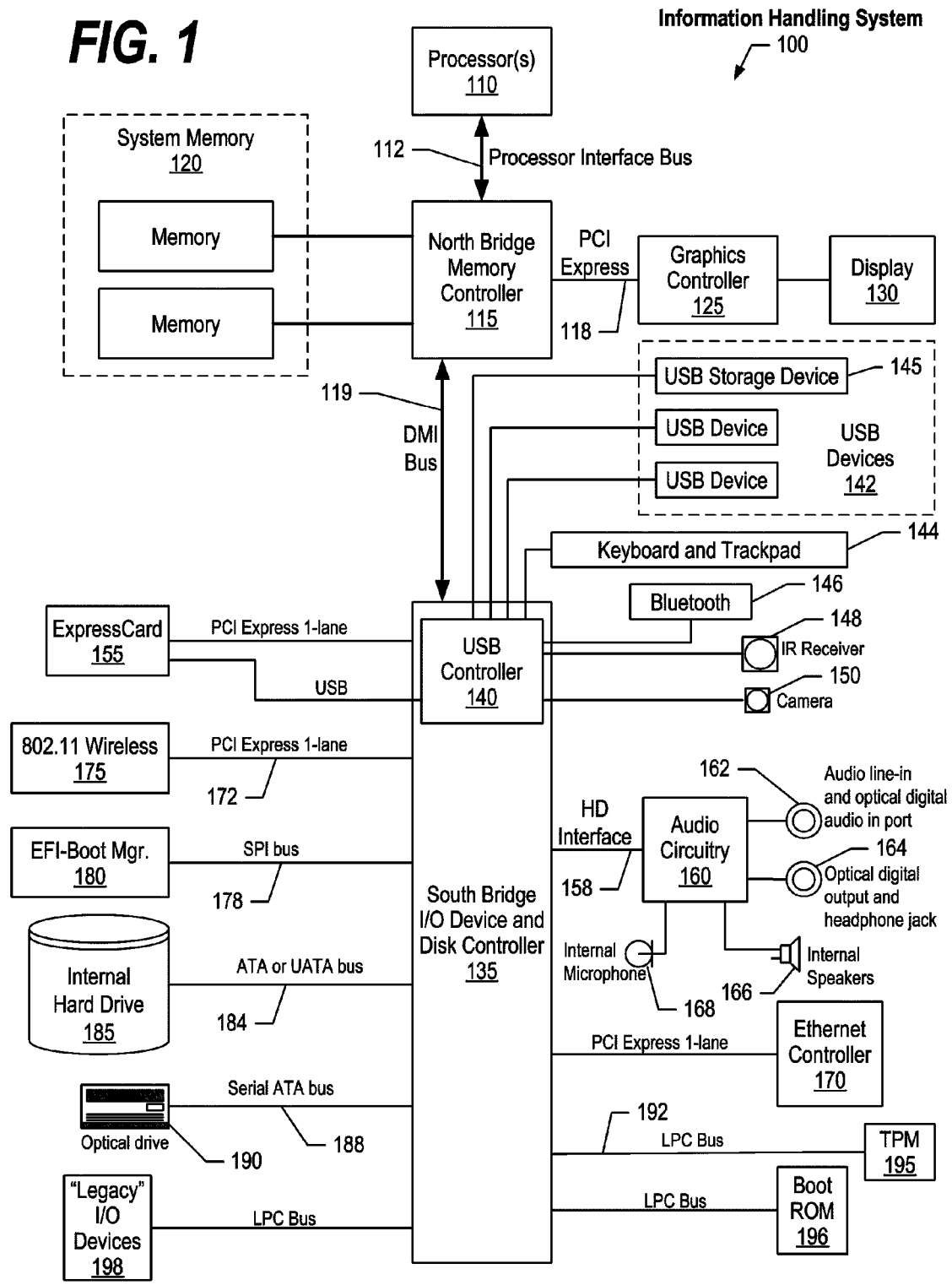
FIG. 1 is a block diagram of a data processing system in which the methods described herein can be implemented.
Figure 2:
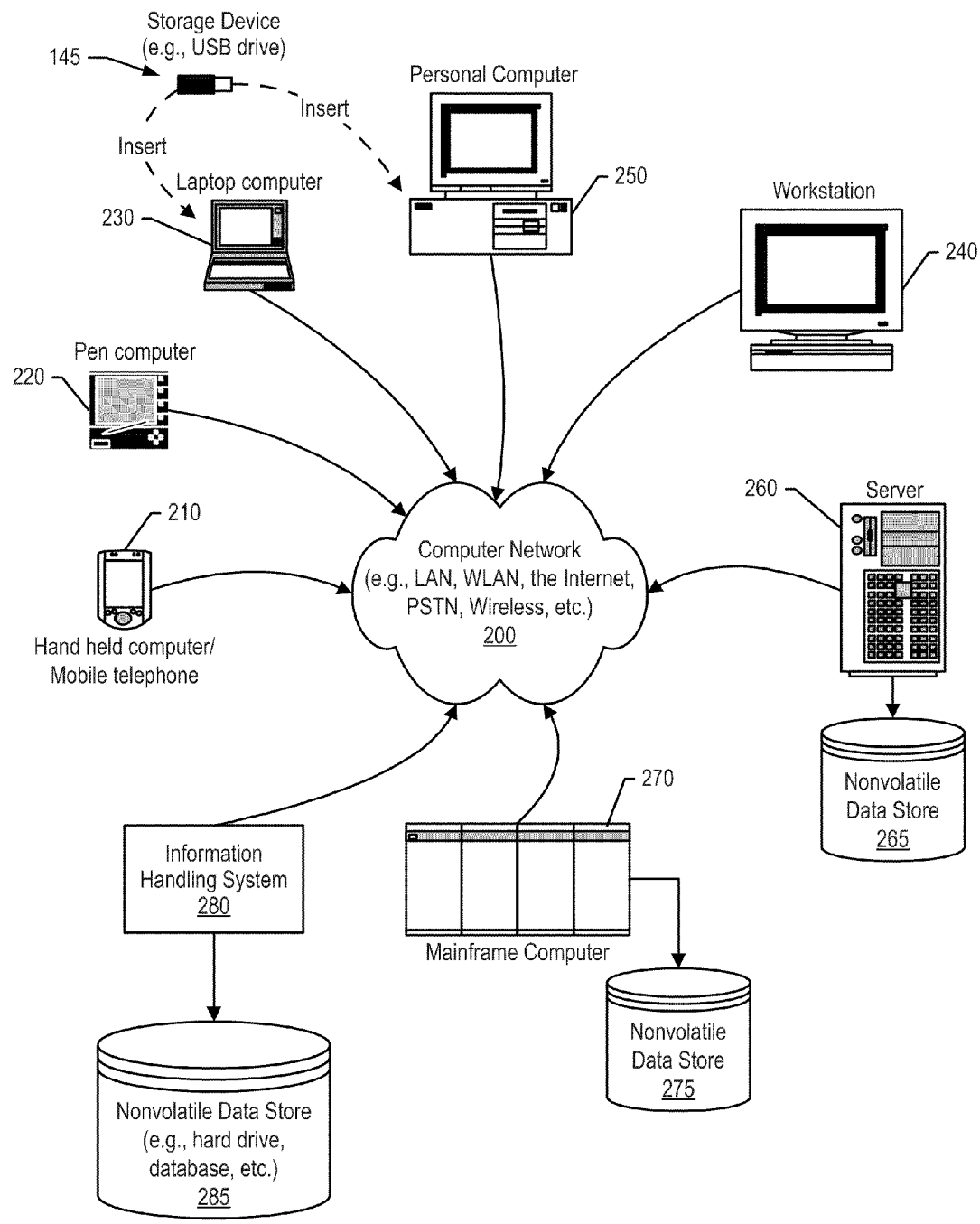
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH).

Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
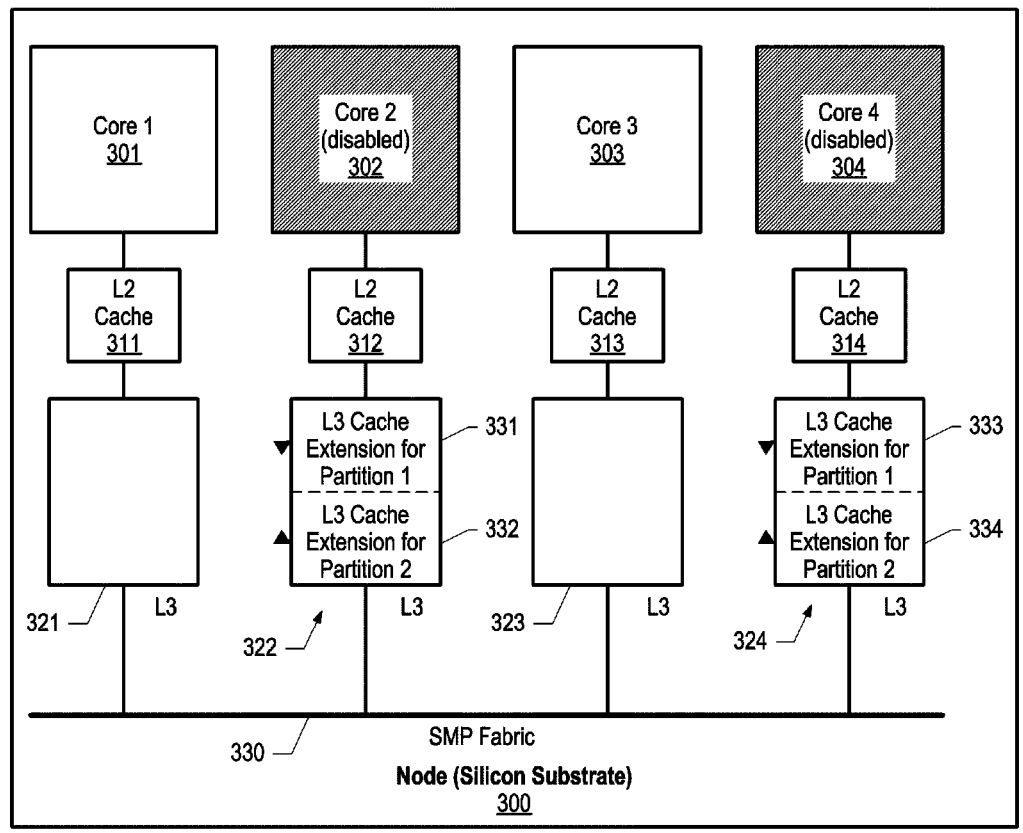
FIG. 3 is a an diagram showing a processing node with multiple processing cores, both disabled and active, where the inactive core's cache memory is utilized by one of the active cores.

FIG. 3 is a an diagram showing a processing node with multiple processing cores, both disabled and active, where the inactive core's cache memory is utilized by one of the active cores. Node 300 includes components that are integrated onto a common substrate, such as a single integrated circuit (IC) die, or multiple dies in a single chip package. The components included in node 300 include multiple processing cores, some of which are disabled while others are active (not disabled). In the diagram shown, two processing cores are shown being active (cores 301 and 303) and two processing cores are shown being disabled (cores 302 and 304). As the term implies, when a processing core is disabled it is essentially turned off and does not execute any instructions. While node 300 is shown with four total processing cores, those skilled in the art will appreciate that a different number of processing cores can be included in a node to utilize the present invention as set forth in the claims.

Each of the processing cores include one or more cache memories. In the diagram shown in FIG. 3, each of the processing cores has an L2 cache memory associated with it (L2 Caches 311, 312, 313, and 314 associated with processing cores 301, 302, 303, and 304, respectively). In addition, each of the processing cores include an L3 cache memory (L3 Caches 321, 322, 323, and 324 associated with processing cores 301, 302, 303, and 304, respectively). However, because core 2 (302) and core 4 (304) are disabled, their respective cache memories will not be used by their respective cores (L2 cache memories 312 and 314 and L3 cache memories 322 and 324 will not be used by their respective processing cores). A common bus (such as SMP fabric 330) is included in node 300 and is used to connect the various node components to one another, such as connecting processes to memories to which they are not associated. In this manner, using bus 330, memory associated with one of the disabled processing cores can be mapped so that the memory is a logical extension of the processing core. In the diagram shown in FIG. 3, the L3 cache memories of the active processing cores has been extended to include the L3 cache memories of the disabled processing cores. In one embodiment, the additional L3 cache memories associated with the disabled processing cores are divided amongst multiple software processes, such as software partitions, that are being executed by the active processing cores. In the diagram shown, the additional L3 cache memories associated with the disabled processing cores are allocated between two software partitions (partition 1 and partition 2). In another embodiment, data addresses of the additional L3 cache memories is not shared when a context switch occurs. In other words, when software partition 1 is being executed by active processing cores 1 (301) and 3 (303), the L3 cache memories associated with the active processing cores is used as a traditional L3 memory cache with data stored in the address space of L3 cache memories 321 and 323. For example, if core 1 (301) stores data while executing partition 1 in a certain memory address of L3 cache 321, the same memory address might subsequently be used by partition 2 after a context switch so that when partition 1 is swapped back in, the data previously stored at that address would be invalid for partition 1 and would have to be retrieved elsewhere (erg., from main memory). In contrast, data stored in the L3 cache memory associated with disabled processing cores (core 2 (302) and core 4 (304)) is not subject to invalidation due to context switches. This is because the memory associated with disabled processing cores is divided amongst the processes (e.g., software partitions). When the first process is swapped in (e.g., partition 1), the L3 memory cache associated with the active processing cores 301 and 303 (L3 caches 321 and 323) are mapped to portions of the L3 memory caches of the disabled processing cores (portion 331 of L3 cache 322 and portion 333 of L3 cache 324 mapped to L3 caches 321 and 323, respectively, when partition 1 is swapped in, and portion 332 of L3 cache 322 and portion 334 of L3 cache 324 mapped to L3 caches 321 and 323, respectively, when partition 2 is swapped in). While the L3 memories associated with the disabled processing cores are shown storing data for two partitions, a different number of partitions could be used and benefit using the techniques described herein. In addition, while the L3 memories associated with the disabled processing cores are shown being mapped to L3 memories of active processing cores, other memories, such as L2 caches 312 and 314, could be likewise mapped either in addition, or in lieu of, mapping the L3 cache memories.

Figure 4:
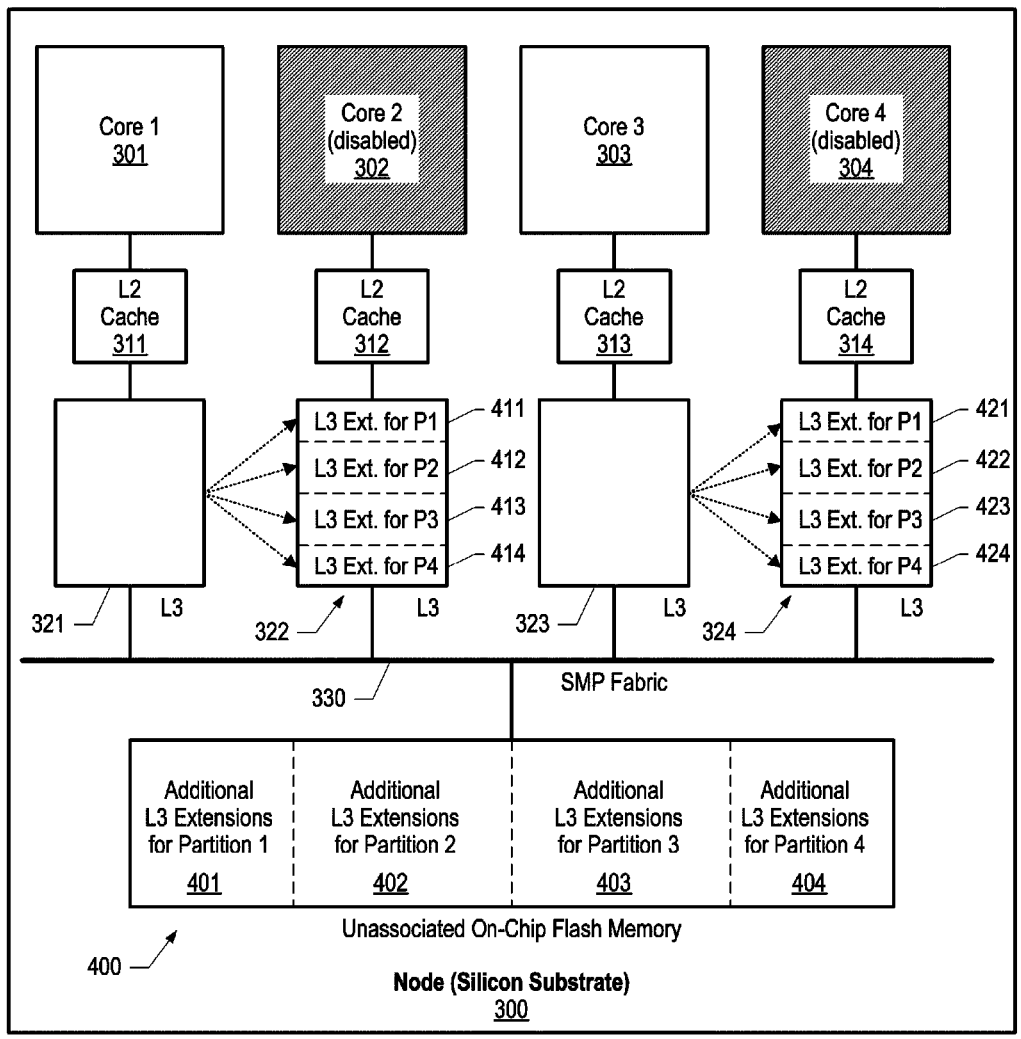
FIG. 4 is an extension of FIG. 3 showing inclusion of additional unassociated on-chip memory that is utilized by the active cores.

FIG. 4 is an extension of FIG. 3 showing inclusion of additional unassociated on-chip memory that is utilized by the active cores. In FIG. 4, the L3 caches associated with the disabled processing cores have been divided into four portions per L3 cache (portions 411, 412, 413, and 414 allocated from L3 cache memory 322 and portions 421, 422, 423, and 424 allocated from L3 cache memory 342) with each of these portions used to store data associated with software process (software partitions) P1 through P4. In addition, unassociated on-chip memory 400 is used to provide further L3 extensions for the various partitions. Unassociated on-chip memory 400 is mapped as an extension to other memory, in this case the L3 memories. Each of the active processing cores (core 1 (301) and core 3 (303)) maps its L3 cache (321 and 323, respectively) to both the L3 cache of one of the disabled cores (core 2 (302) and core 4 (304)) and to an allocated area of unassociated on-chip memory 400. In the example shown, core 1 (301) maps to its L3 cache, then to a portion of L3 cache 322 depending upon the software partition currently being executed, and then to a portion of unassociated on-chip memory 400, again depending upon the partition that is currently being executed. Each of the additional L3 extensions (401, 402, 403, and 404) allocated in unassociated on-chip memory is further allocated between the active processing cores. In other words, partition 1 (401) includes a portion mapped as an extension to core 1 (301) and a portion mapped as an extension to core 3 (303). Likewise, the other extensions of unassociated on-chip memory (402-404) also each include a portion mapped to active processing core 301 and a portion mapped to active processing core 303. When a context switch occurs and a first process (e.g., software partition P1) is swapped and data is needed by active processing core 1 (301), it first checks to see if the data is available in L2 cache 311, if the data is not found in L2 cache 311, it checks its L3 cache memory 321.

In one embodiment, the memory space of L2 cache 311 and the memory space of L3 cache 321 are shared amongst the various processes (software partition processes P1 through P4) so that when one partition is swapped in it can write to a space in the L3 cache that contained data written when one of the other partition processes was being executed. For example, in this embodiment, when P1 is being executed by core 1, it may write data to an address "x" of L3 cache 321 that previously contained data that was written when P2 was being executed. When a context switch occurs and P2 is swapped in, if the data that was at address "x" is needed, the data is no longer at address "x" because data for process P1 was written to that address location, so core 1 (301) will retrieve the data from elsewhere (e.g., main memory). In this embodiment, the end of the active processing core's L3 cache is mapped to the beginning of the portion of L3 cache memory associated with the disabled processing core, and the end of this portion will be mapped to the additional L3 extension allocated from unassociated on-chip memory 400. For example, in this embodiment, for active processing core 301 when process P1 is swapped in, the end of L3 cache 321 is mapped to the beginning of L3 extension 411 and the end of L3 extension 411 is mapped to the beginning of additional extension 401 allocated to active processing core 301. Data stored in the additional cache extensions (411 and 401) preserved during context switches so that when one of the other processes (P2 through P4) are being executed, they do not use extensions 411 and 401. Instead, when P2 is swapped in during a context switch, for active processing core 301, L3 cache 321 is mapped to L3 extension 412 and then to additional L3 extension 402 that is allocated to active processing core 301. Likewise, when P2 is swapped in, for active processing core 303, L3 cache 323 is mapped to L3 extension 422 which is mapped to additional L3 extension 402 that is allocated to active processing core 303. Similar mapping occurs when processes (software partitions) P3 and P4 are swapped in during context switches.

In an alternative embodiment, the L3 caches associated with the active processing cores (caches 321 and 323) can also be partitioned similar to the divided L3 caches shown in 322 and 324. In this alternative embodiment, each process (P1 through P4) would have an exclusive portion of L3 cache 321 and 323. In this alternative embodiment, when P1 is swapped in, for active processing core 301, the exclusive portion of L3 cache 321 for P1 is mapped to L3 extension 411 and to the portion of additional L3 extension 401 allocated for active processing core 301. Likewise, in this alternative embodiment, for active processing core 303, when P1 is swapped in, the exclusive portion of L3 cache 323 for P1 is mapped to L3 extension 421 and to the portion of additional L3 extension 401 allocated for active processing core 303.

Figure 5:
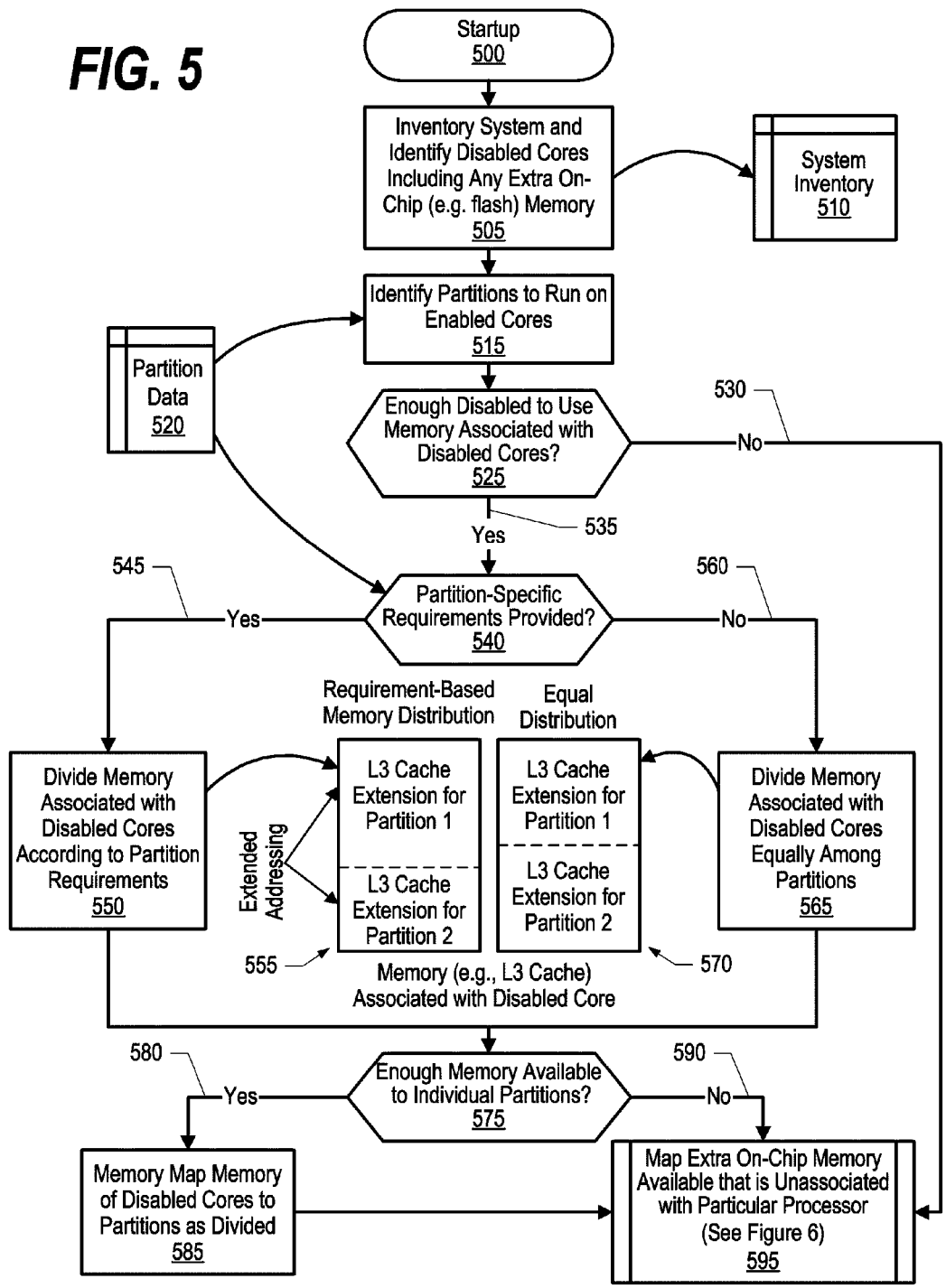
FIG. 5 is a flowchart showing startup processing that inventories the processing cores and decides how to divide cache memory associated with disabled processing cores.

FIG. 5 is a flowchart showing startup processing that inventories the processing cores and decides how to divide cache memory associated with disabled processing cores. Startup processing commences at 500 whereupon, at step 505, an inventory is taken of the computer system (processing node) to identify disabled processing cores, the active processing cores, and any extra on-chip memory included in the node substrate. This inventory data is stored in system inventory data store 510 for future reference. At step 515, processes, such as software partitions, are identified that will run on the enabled (active) processing cores by reading partition data 520.

A determination is made as to whether there are enough disabled processing cores to take advantage of the memory (e.g., L3 memory, etc.) associated with the disabled cores (decision 525). If there are not enough disabled cores to use the associated memories, then decision 525 branches to "no" branch 530 bypassing steps 540 to 585. For example, in a four-core system, if all four cores are enabled (active), then there are no memories associated with disabled cores so such memories are unavailable for use by the other cores. On the other hand, if there are enough disabled cores to take advantage of the memories associated with the disabled cores (e.g., such as the example shown in FIGS. 3 and 4 where in a four-node system, two nodes were disabled and two nodes were enabled (active)), then decision 525 branches to "yes" branch 535 whereupon a determination is made as to whether partition data 520 specifies any process (partition) specific configuration requirements (decision 540). Using partition-specific configuration requirements, one partition can be given more of the memory space available in the cache extensions based on the processing needs of the particular software partition, etc. If process (partition) specific configuration requirements are specified, then decision 540 branches to "yes" branch 545 whereupon, at step 550, the available additional memories are divided according to the configuration settings. As shown, the resulting additional cache memories can be unequally distributed amongst the partitions as shown in cache memory layout 555. On the other hand, if process (partition) specific configuration requirements are not provided, then decision 540 branches to "no" branch 560 whereupon, at step 565, the additional cache memories are divided equally amongst the partitions that will be running on the system, as depicted in cache memory layout 570.

A determination is made as to whether there is enough additional cache memory to make such memory available to the individual processes (partitions) (decision 575). For example, if numerous partitions are executing on the system, not enough additional cache memory may be available to any given partition to make it worthwhile to map to the additional cache memories as the address spaces of the additional cache memories assigned to each partition may be too small. One way to avoid this issue is by setting up the partition configuration to allocate the additional cache memory to a few select partitions. For example, if there are ten partitions running on a system and the system administrator determines that two of the partitions would greatly benefit from the additional cache memory, then the configuration settings could be set to allocate additional cache memory only to these two partitions. Returning to decision 575, if enough memory is available to allocate to individual partitions, then decision 575 branches to "yes" branch 580 whereupon, at step 585, the cache memory associated with the disabled processing cores is mapped to the active processing cores' cache memories as previously described. On the other hand, if there is not enough memory available to allocate to the individual partitions, then decision 575 branches to "no" branch 590.

Predefined process 595 is performed after other processing shown in FIG. 5 in order to map any unassociated on-chip memory included in the node substrate. This additional unassociated on-chip memory was shown as memory 400 in FIG. 4 and previously discussed. Details regarding the mapping of this unassociated on-chip memory are shown in FIG. 6 and corresponding text.

Figure 6:
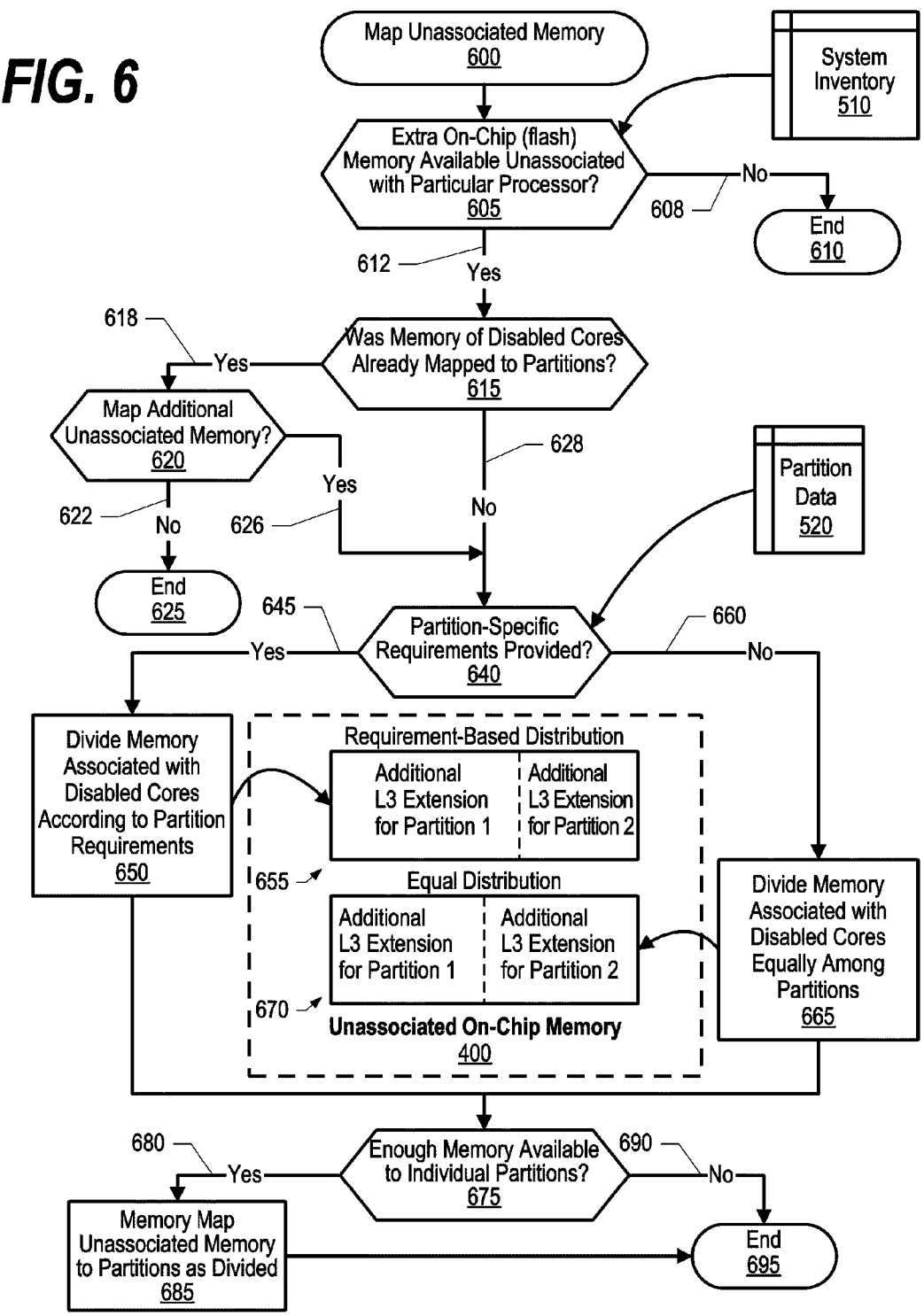
FIG. 6 is a flowchart showing steps used to map the unassociated on-chip memory to active cores.

FIG. 6 is a flowchart showing steps used to map the unassociated on-chip memory to active cores. Processing commences at 600 whereupon a determination is made as to whether the system inventory performed in FIG. 5 and stored in data store 510 identified any unassociated on-chip memory included in the node substrate (decision 605). If no unassociated on-chip memory is included in the node substrate, then decision 605 branches to "no" branch 608 whereupon processing ends at 610. On the other hand, if unassociated on-chip memory is included in the node substrate, then decision 605 branches to "yes" branch 612 in order to divide the unassociated on-chip memory amongst the various processes (partitions) being executed by the processing node.

A determination is made as to whether memory associated with disabled processing cores has already been mapped to the processes (partitions) running on the system (decision 615). If such additional cache memory was already mapped, then decision 615 branches to "yes" branch 618 whereupon a determination is made as to whether to also map the unassociated on-chip memory (decision 620). If additional mapping is not desired (e.g., due to possible performance considerations, etc.), then decision 620 branches to "no" branch 622 whereupon processing ends at 625. On the other hand, if such additional mapping of the unassociated on-chip memory is desired, then decision 620 branches to "yes" branch 626. Returning to decision 615, if memory associated with disabled cores was not mapped to processes (partitions), then decision 615 branches to "no" branch 628 bypassing decision 620.

A determination is made as to whether partition data 520 specifies any process (partition) specific configuration requirements (decision 640). Using partition-specific configuration requirements, one partition can be given more of the memory space available in the unassociated on-clip memory based on the processing needs of the particular software partition, etc. if process (partition) specific configuration requirements are specified, then decision 640 branches to "yes" branch 645 whereupon, at step 650, the available unassociated on-chip memory is divided according to the configuration settings. As shown, the resulting additional cache extensions can be unequally distributed amongst the partitions as shown in unassociated on-chip memory layout 655. On the other hand, if process (partition) specific configuration requirements are not provided, then decision 640 branches to "no" branch 660 whereupon, at step 665, the unassociated on-chip memory is divided equally amongst the partitions that will be running on the system, as depicted in unassociated on-chip memory layout 670.

A determination is made as to whether there is enough unassociated on-chip memory make such memory available to the individual processes (partitions) (decision 675). For example, if numerous partitions are executing on the system, not enough unassociated on-chip memory may be available to any given partition to make it worthwhile to map to the unassociated on-chip memory as the address spaces of the additional cache memories assigned to each partition may be too small. One way to avoid this issue is by setting up the partition configuration to allocate the unassociated on-chip memory to a few select partitions. For example, if there are ten partitions running on a system and the system administrator determines that two of the partitions would greatly benefit from the additional cache memory, then the configuration settings could be set to allocate the unassociated on-chip memory only to these two partitions. Returning to decision 675, if enough memory is available to allocate to individual partitions, then decision 675 branches to "yes" branch 680 whereupon, at step 685, the unassociated one chip memory is mapped to the active processing cores' cache memories as previously described. On the other hand, if there is not enough memory available to allocate to the individual partitions, then decision 675 branches to "no" branch 690. Processing used to map unassociated on-chip memory thereafter ends at 695.

Figure 7:
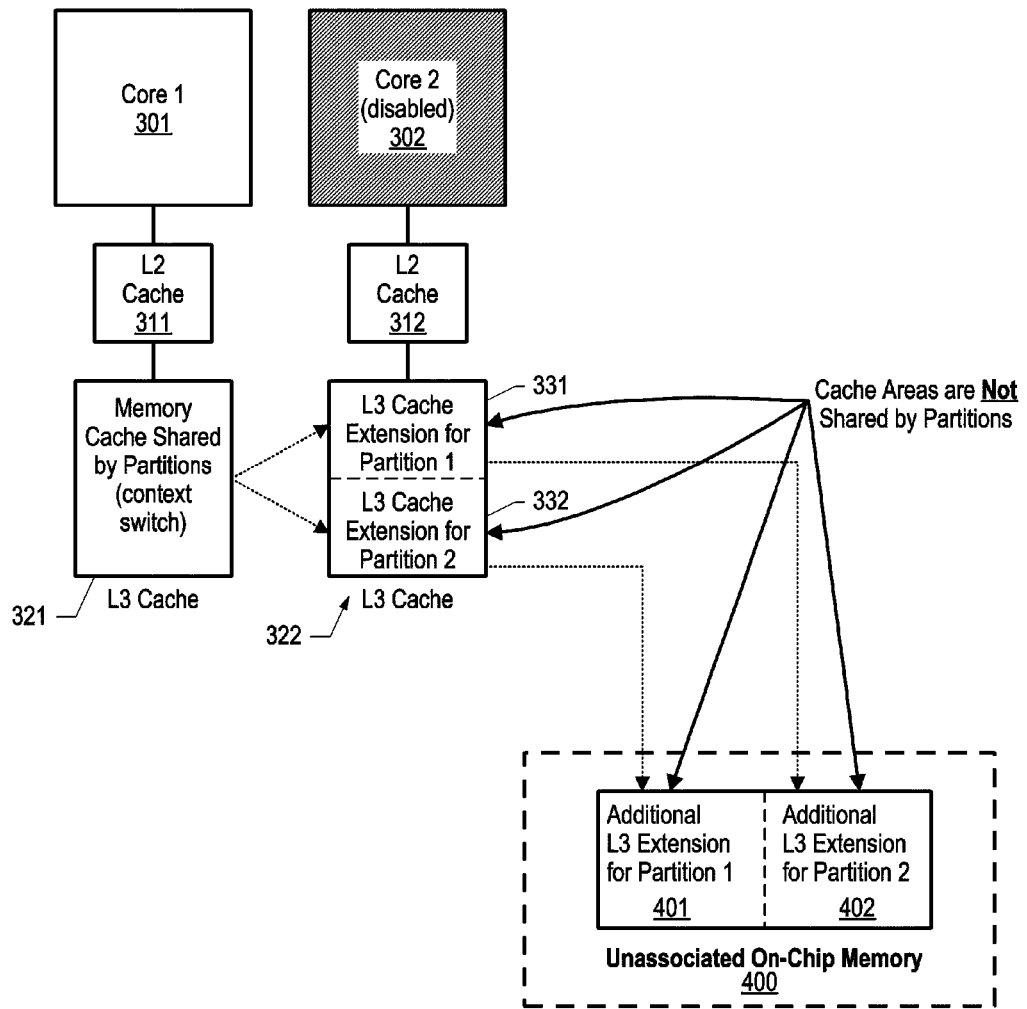
FIG. 7 is a flowchart showing an active core mapping extensions into a disabled core's memory as well as an unassociated on-chip memory.

FIG. 7 is a flowchart showing an active core mapping extensions into a disabled core's memory as well as an unassociated on-chip memory. Core 1 (301) is enabled (active) and core 2 (302) is disabled. L3 cache memory 321 associated with core 301 is shared by partitions which are swapped in and out during context switches. When partition 1 is swapped in, the end of cache 321 is mapped to portion 331 of cache 322 which is associated with disabled processing core 2 (302). If unassociated on-chip memory is available, then portion 331 of L3 cache 322 is mapped to portion 401 of unassociated on-chip memory 400. When partition 2 is swapped in, the end of cache 321 is mapped to portion 332 of cache 322 which is associated with disabled processing core 2 (302). If unassociated on-chip memory is available, then portion 332 of L3 cache 322 is mapped to portion 402 of unassociated on-chip memory 400.

In one embodiment, the additional cache extensions (e.g., portions 331 and 332, and extensions 401 and 402) are treated as additional cache tiers. In this embodiment, when Partition 1 is executing and its L3 cache 321 is full, then an LRU (least recently used) process moves the least recently used item from cache 321 to portion 331 rather than discarding the data. In this regard, portion 331 could be seen acting as a private L4 cache for Partition 1. Here, the L4 cache is a "private" cache because it is reserved for data used by Partition 1. Likewise, portion 332 would be acting as a private L4 cache for Partition 2 as this cache would be reserved for Partition 2's data. The additional memory extensions allocated from unassociated on-chip memory 400 (portion 401 and 402) could either be used as extensions of the private L4 cache or could be further cache tiers (e.g., an L5 cache). If treated as a L5 cache, for example, when L4 cache 331 is full and the LRU algorithm operates, the LRU would move the least recently used data from L4 cache 331 to L5 cache 401. Again, because memory areas 401 and 402 are reserved for data pertaining to Partition 1 and 2, respectively, the L5 caches that would be allocated from unassociated on-chip memory would be "private" caches similar to L4 caches 331 and 332.

Figure 8:
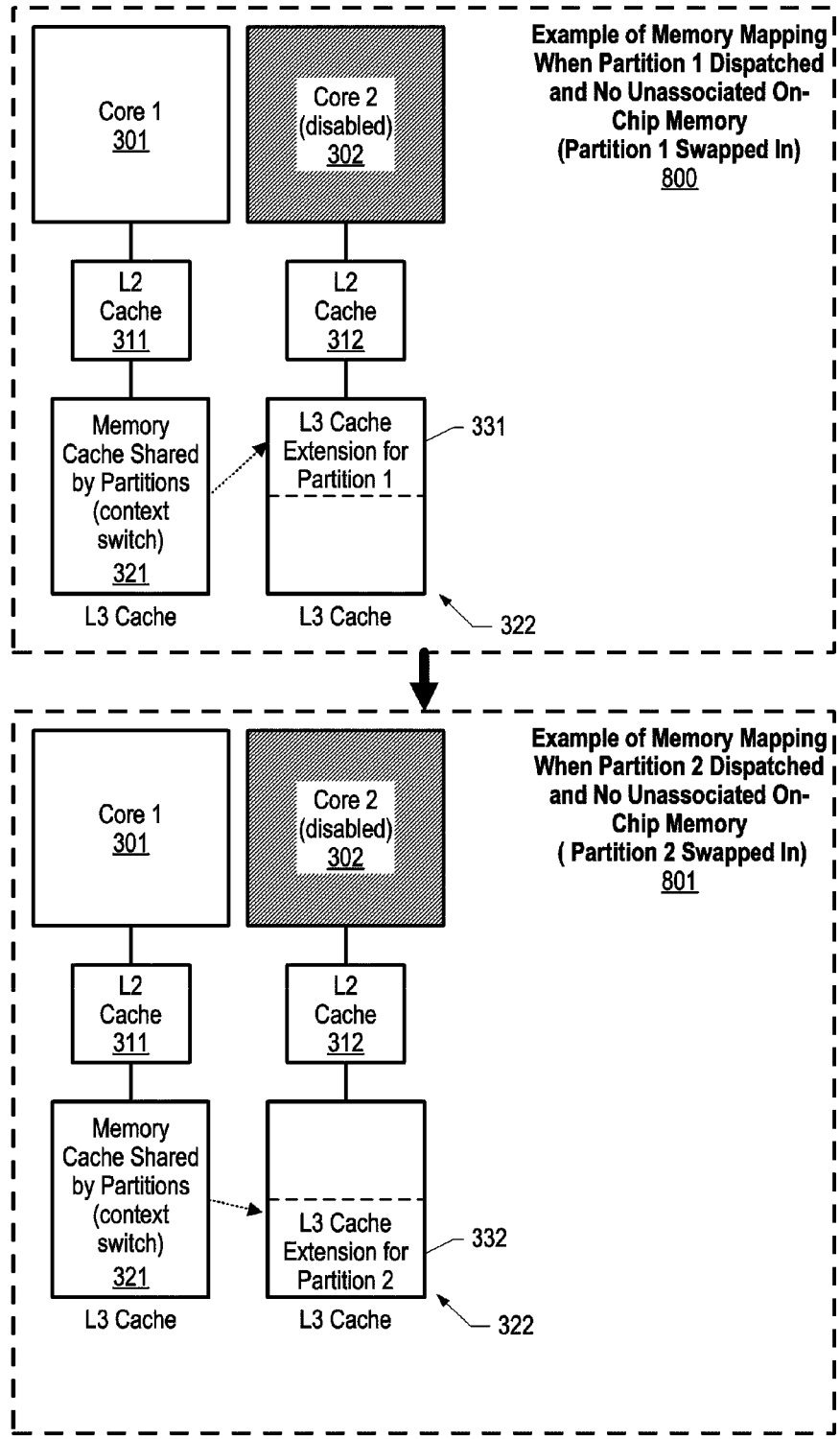
FIG. 8 shows an example memory mapping before and after a context switch is made between two partitions.

FIG. 8 shows an example memory mapping before and after a context switch is made between two partitions. FIG. 8 shows an embodiment where unassociated on-chip memory is not utilized. In the example, core 1 (301) is enabled (active) and core 2 (302) is disabled. L3 cache memory 321 associated with core 301 is shared by partitions which are swapped in and out during context switches. Block 800 shows partition 1 being executed (swapped in) so that L3 cache 321 is mapped to portion 331 of L3 cache 322 which is associated with disabled processing core 302.

Block 801 shows mapping that results when partition 2 is swapped in during a context switch. Here, L3 cache memory 321 associated with core 301 is mapped to portion 332 of L3 cache 322. In this manner, the data cached to L3 memory 322 when partition 1 was executing is not overwritten when partition 2 is executing and, likewise, partition 1 does not overwrite any of partition 2's data cached to L3 cache memory 322.

Figure 9:
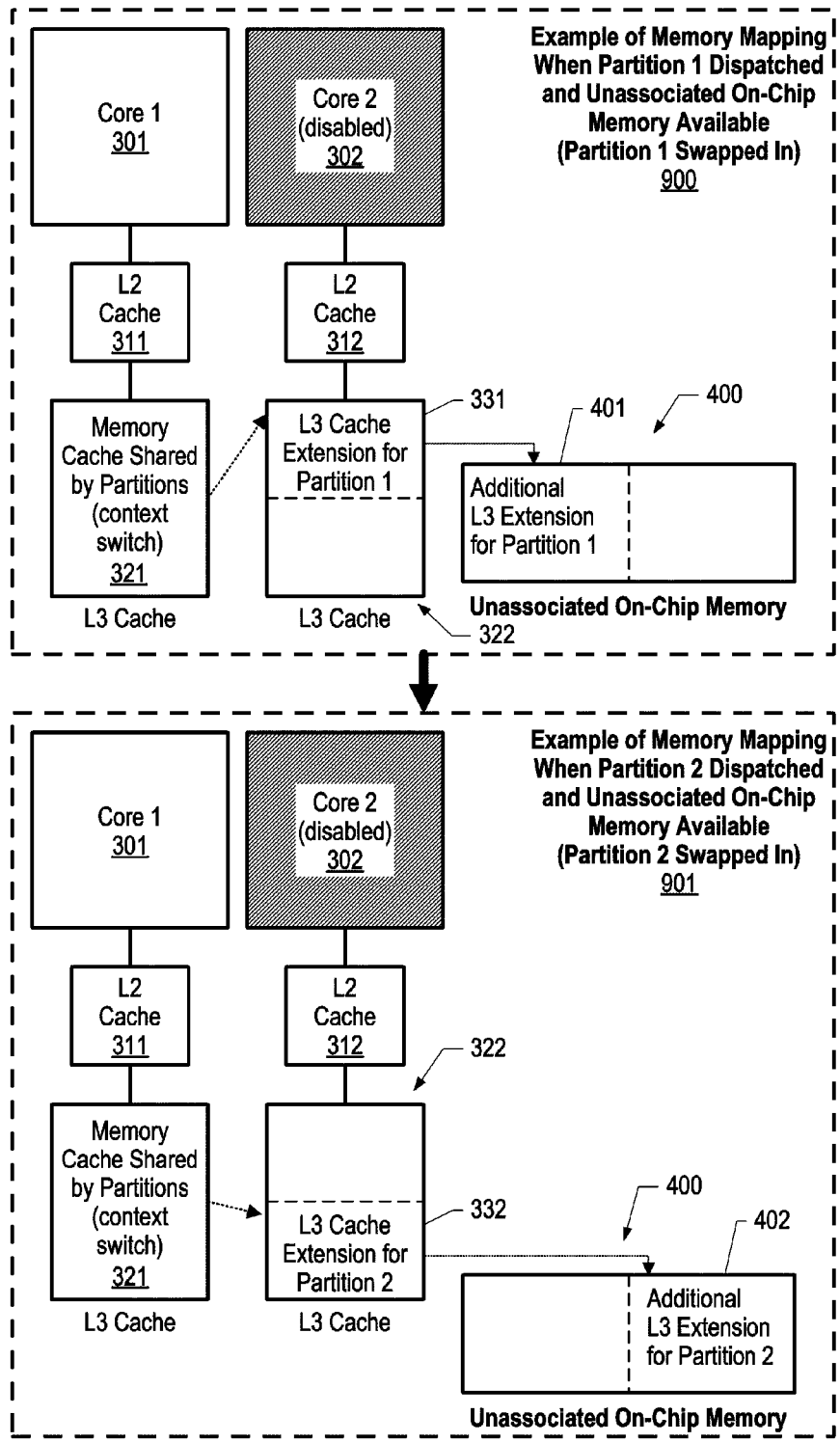
FIG. 9 shows an extension of the example shown in FIG. 8 that further maps into the unassociated on-chip memory.

FIG. 9 shows an extension of the example shown in FIG. 8 that further maps into the unassociated on-chip memory. In block 900, partition 1 is shown being executed (swapped in) so that L3 cache 321 is mapped to portion 331 of L3 cache 322 which is associated with disabled processing core 302 Additional extension 401, which is a portion of unassociated on-chip memory 400, is mapped from portion 331. In this mariner, when partition 1 is executing, the address space goes from L3 cache 321 to portion 331 of L3 cache 322 to portion 401 of unassociated on-chip memory 401.

Block 901 shows mapping that results when partition 2 is swapped in during a context switch. Here, L3 cache memory 321 associated with core 301 is mapped to portion 332 of L3 cache 322 which is further mapped to portion 402 of unassociated on-chip memory 400. In this manner, the data cached to either L3 memory 322 or to memory portion 401 when partition 1 was executing is overwritten when partition 2 is executing and, likewise, partition 1 does not overwrite any of partition 2's data cached to L3 cache memory 322 or to memory portion 402 of unassociated on-chip memory 400.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by a processing node comprising:
    identifying a disabled processing core and an active processing core from a plurality of processing cores included in the processing node, wherein each of the plurality of processing cores is assigned a cache memory;
    extending a memory map of the cache memory assigned to the active processing core to include the cache memory assigned to the disabled processing core, wherein the cache memory assigned to the active processing core is a first level cache tier in a plurality of cache tiers and the cache memory assigned to the disabled processing core is a second level cache tier in the plurality of cache tiers;
    storing a first plurality of data processed by the active processing core to the cache memory assigned to the active processing core; and
    using the extended memory map, storing a second plurality of data processed by the active processing core to the cache memory assigned to the inactive processing core, wherein the second plurality of data is different than the first plurality of data.

2. The method of claim 1 further comprising:
    receiving a request to store a third plurality of data in the first level cache tier;
    determining, in response to identifying that the first level cache tier is full, that the second plurality of data is least recently used data stored in the first level cache tier, wherein the second plurality of data is stored in the second level cache tier in response to the determination; and
    storing the third plurality of data to the first level cache tier in an address location where the second plurality of data was stored in the first level cache tier.

3. The method of claim 1 further comprising:
    reserving, by the active processing core, a first portion of the cache memory assigned to the inactive processing core to a first process and reserving, by the active processing core, a second portion of the cache memory assigned to the inactive core to a second process;
    executing, by the active processing core, the first process, wherein during the execution of the first process, data is stored in the cache memory assigned to the active processing core and in the area of the cache memory assigned to the inactive core that was reserved for the first process;
    performing, by the active processing core, a context switch from the first process to the second process; and
    following the context switch executing, by the active processing core, the second process, wherein during the execution of the second process, data is stored in the cache memory assigned to the active processing core and in the area of the cache memory assigned to the inactive core that was reserved for the second process.

4. The method of claim 3 wherein the first process is a first software partition process and wherein the second process is a second software partition process, and the method further comprising:
    prior to the reserving, identifying one or more partition-specific configuration settings regarding usage of the cache memory assigned to the inactive core; and
    based on the configuration settings, allocating a first amount of the memory to the first portion and a second amount of the memory to the second portion, wherein the first and second amounts are different amounts.

5. The method of claim 4 further comprising:
    allocating a first and a second memory extension from an unassociated on-chip memory, wherein the first memory extension is reserved by the first process and the second memory extension is reserved by the second process, and wherein the unassociated on-chip memory, the active processing core, the inactive processing core, the memory associated with the active processing core, and the memory associated with the inactive processing core are each within a common substrate.

6. The method of claim 5 wherein, during execution of the first process, the data is stored in the cache memory assigned to the active processing core, the area of the cache memory assigned to the inactive core that was reserved for the first process, and in the first memory extension allocated in the unassociated on-chip memory, and wherein, during execution of the second process following the context switch, data is stored in the cache memory assigned to the active processing core, in the area of the cache memory assigned to the inactive core that was reserved for the second process, and in the second memory extension allocated in the unassociated on-chip memory.

7. The method of claim 6 further comprising:
    prior to the allocating, identifying one or more configuration settings regarding usage of the unassociated on-chip memory; and
    based on the configuration settings, allocating a first amount of the unassociated on-chip memory to the first extension and a second amount of the unassociated on-chip memory to the second extension, wherein the first and second amounts are different amounts.

8. An information handling system comprising:
a processing node that comprises:
- a disabled processing core and an active processing core from a plurality of processing cores, wherein each of the plurality of processing cores are within a common substrate; and
- a cache memory assigned to each of the plurality of processing cores, wherein the cache memories are each within the common substrate;

a set of instructions executed by the processing node in order to perform actions of:
identifying a disabled processing core and an active processing core from a plurality of processing cores included in a processing node, wherein each of the plurality of processing cores is assigned a cache memory;
extending a memory map of the cache memory assigned to the active processing core to include the cache memory assigned to the disabled processing core, wherein the cache memory assigned to the active processing core is a first level cache tier in a plurality of cache tiers and the cache memory assigned to the disabled processing core is a second level cache tier in the plurality of cache tiers;
storing a first plurality of data processed by the active processing core to the cache memory assigned to the active processing core; and
using the extended memory map, storing a second plurality of data processed by the active processing core to the cache memory assigned to the inactive processing core, wherein the second plurality of data is different than the first plurality of data.

9. The information handling system of claim 8 wherein the actions further comprise:
receiving a request to store a third plurality of data in the first level cache tier;
determining, in response to identifying that the first level cache tier is full, that the second plurality of data is least recently used data stored in the first level cache tier, wherein the second plurality of data is stored in the second level cache tier in response to the determination; and
storing the third plurality of data to the first level cache tier in an address location where the second plurality of data was stored in the first level cache tier.

10. The information handling system of claim 8 further comprising additional actions of:
reserving, by the active processing core, a first portion of the cache memory assigned to the inactive processing core to a first process and reserving, by the active processing core, a second portion of the cache memory assigned to the inactive core to a second process;
executing, by the active processing core, the first process, wherein during the execution of the first process, data is stored in the cache memory assigned to the active processing core and in the area of the cache memory assigned to the inactive core that was reserved for the first process;
performing, by the active processing core, a context switch from the first process to the second process; and
following the context switch executing, by the active processing core, the second process, wherein during the execution of the second process, data is stored in the cache memory assigned to the active processing core and in the area of the cache memory assigned to the inactive core that was reserved for the second process.

11. The information handling system of claim 10 wherein the first process is a first software partition process and wherein the second process is a second software partition process.

12. The information handling system of claim 11 further comprising additional actions of:
prior to the reserving, identifying one or more partition-specific configuration settings regarding usage of the cache memory assigned to the inactive core; and
based on the configuration settings, allocating a first amount of the memory to the first portion and a second amount of the memory to the second portion, wherein the first and second amounts are different amounts.

13. The information handling system of claim 10 further comprising:
an unassociated on-chip memory that is within the common substrate; and
further comprising additional actions of:
allocating a first and a second memory extension from the unassociated on-chip memory, wherein the first memory extension is reserved by the first process and the second memory extension is reserved by the second process.

14. The information handling system of claim 13 further comprising additional actions of:
prior to the allocating, identifying one or more configuration settings regarding usage of the unassociated on-chip memory; and
based on the configuration settings, allocating a first amount of the unassociated on-chip memory to the first extension and a second amount of the unassociated on-chip memory to the second extension, wherein the first and second amounts are different amounts.

15. A computer program product stored in a computer storage medium, comprising functional descriptive material that, when executed by an information handling system, causes the information handling system to perform actions that include:
identifying a disabled processing core and an active processing core from a plurality of processing cores included in a processing node, wherein each of the plurality of processing cores is assigned a cache memory;
extending a memory map of the cache memory assigned to the active processing core to include the cache memory assigned to the disabled processing core, wherein the cache memory assigned to the active processing core is a first level cache tier in a plurality of cache tiers and the cache memory assigned to the disabled processing core is a second level cache tier in the plurality of cache tiers;
storing a first plurality of data processed by the active processing core to the cache memory assigned to the active processing core; and
using the extended memory map, storing a second plurality of data processed by the active processing core to the cache memory assigned to the inactive processing core, wherein the second plurality of data is different than the first plurality of data.

16. The computer program product of claim 15 further comprising additional actions of:
reserving, by the active processing core, a first portion of the cache memory assigned to the inactive processing core to a first process and reserving, by the active processing core, a second portion of the cache memory assigned to the inactive core to a second process;
executing, by the active processing core, the first process, wherein during the execution of the first process, data is stored in the cache memory assigned to the active processing core and in the area of the cache memory assigned to the inactive core that was reserved for the first process;

performing, by the active processing core, a context switch from the first process to the second process; and following the context switch executing, by the active processing core, the second process, wherein during the execution of the second process, data is stored in the cache memory assigned to the active processing core and in the area of the cache memory assigned to the inactive core that was reserved for the second process.

17. The computer program product of claim 16 wherein the first process is a first software partition process and wherein the second process is a second software partition process.

18. The computer program product of claim 17 further comprising additional actions of:

prior to the reserving, identifying one or more partition-specific configuration settings regarding usage of the cache memory assigned to the inactive core; and based on the configuration settings, allocating a first amount of the memory to the first portion and a second amount of the memory to the second portion, wherein the first and second amounts are different amounts.

19. The computer program product of claim 16 further comprising additional actions of:

allocating a first and a second memory extension from an unassociated on-chip memory, wherein the first memory extension is reserved by the first process and the second memory extension is reserved by the second process, and wherein the unassociated on-chip memory, the active processing core, the inactive processing core, the memory associated with the active processing core, and the memory associated with the inactive processing core are each within a common substrate.

20. The computer program product of claim 15 wherein the cache memory assigned to the active processing core is a first level cache tier in a plurality of cache tiers and the cache memory assigned to the disabled processing core is a second level cache tier in the plurality of cache tiers, wherein the method further comprises:

receiving a request to store a third plurality of data in the first level cache tier;

determining, in response to identifying that the first level cache tier is full, that the second plurality of data is least recently used data stored in the first level cache tier, wherein the second plurality of data is stored in the second level cache tier in response to the determination; and storing the third plurality of data to the first level cache tier in an address location where the second plurality of data was stored in the first level cache tier.

* * * * *